Sept. 2, 1958  L. D. WEBSTER  2,850,216
SEGMENTED GATE FOR SPREADER BOX
Filed Feb. 19, 1954  3 Sheets-Sheet 1
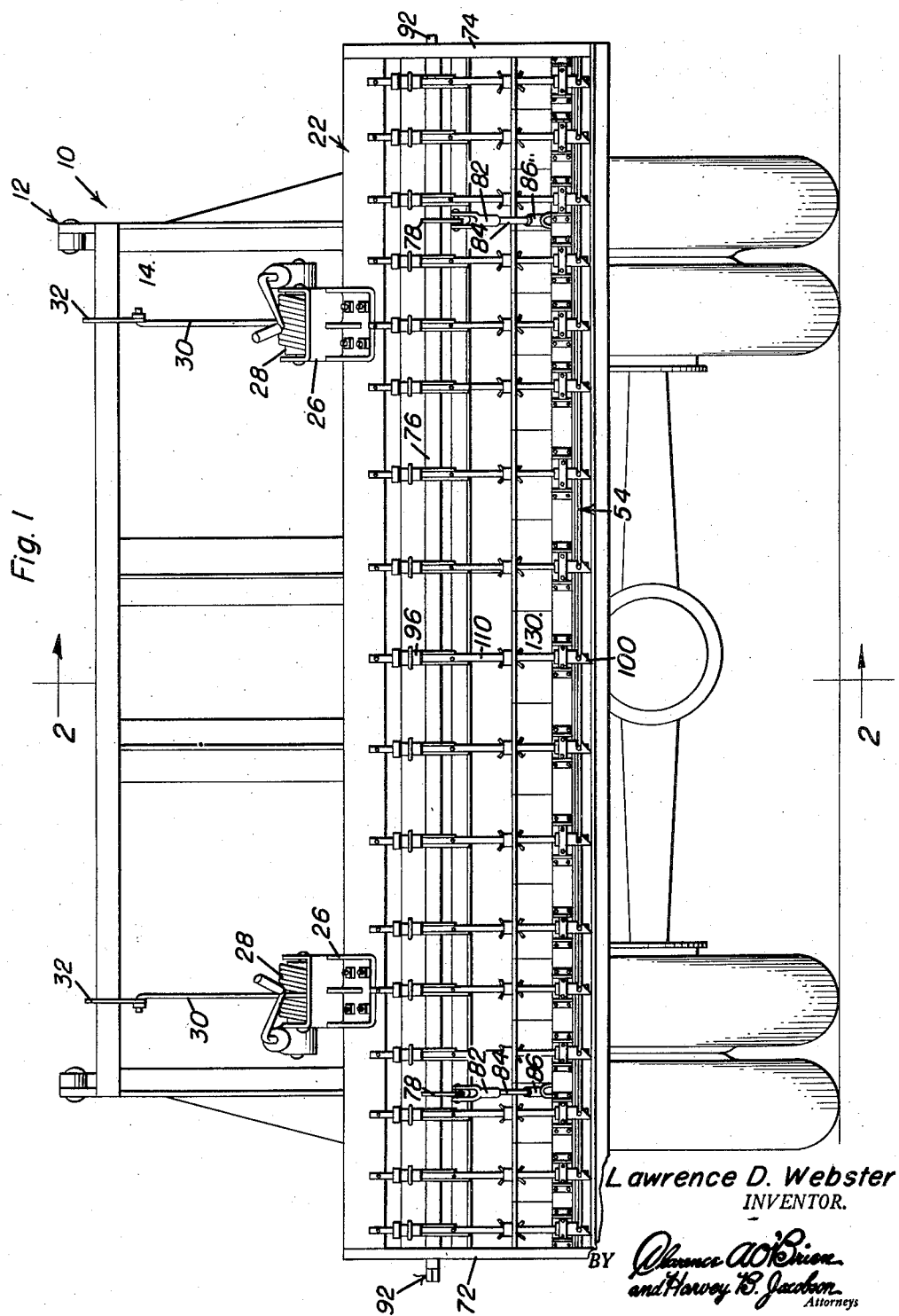
Lawrence D. Webster
INVENTOR.

Sept. 2, 1958  L. D. WEBSTER  2,850,216
SEGMENTED GATE FOR SPREADER BOX
Filed Feb. 19, 1954  3 Sheets-Sheet 2
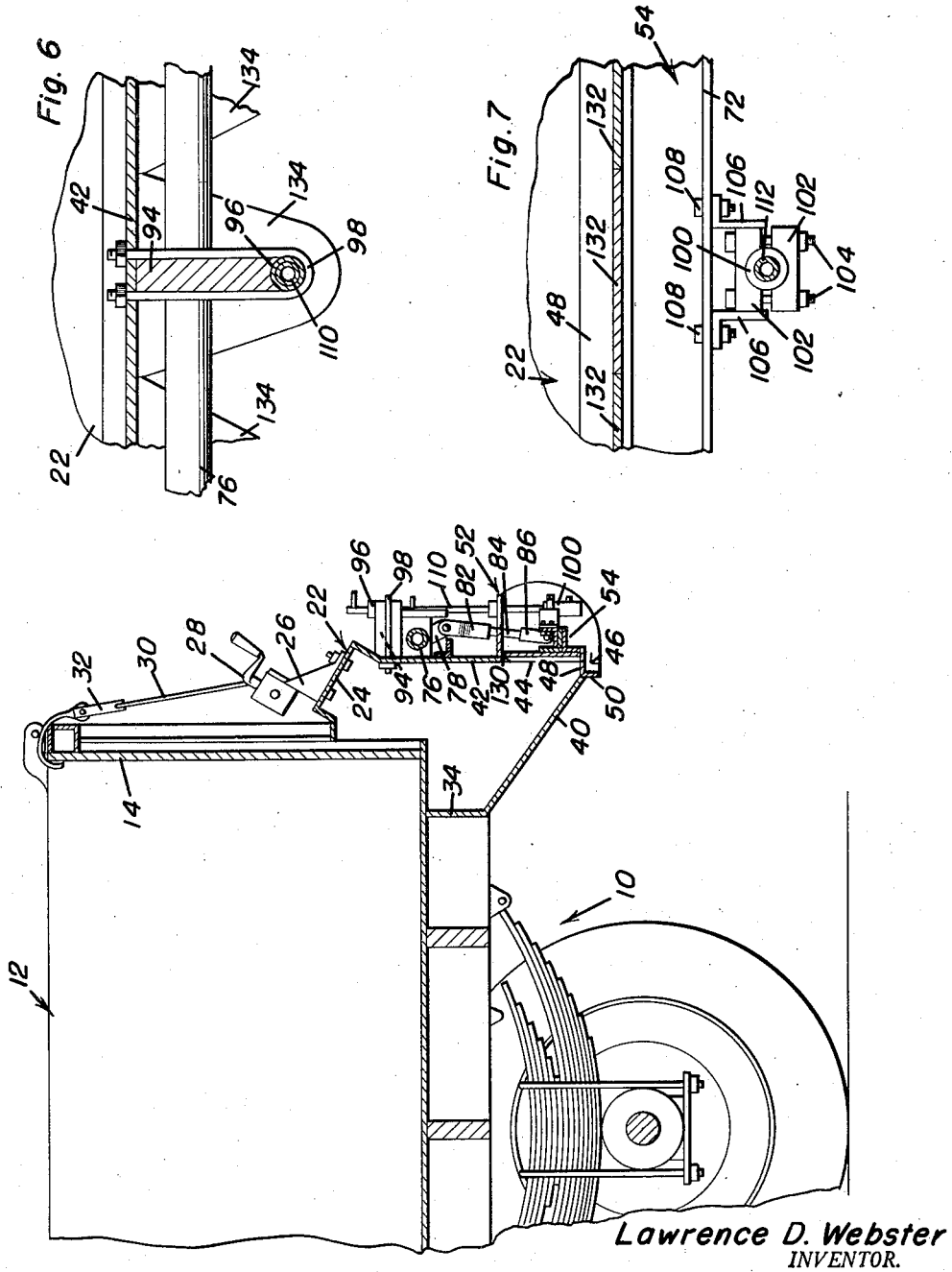
Lawrence D. Webster
INVENTOR.

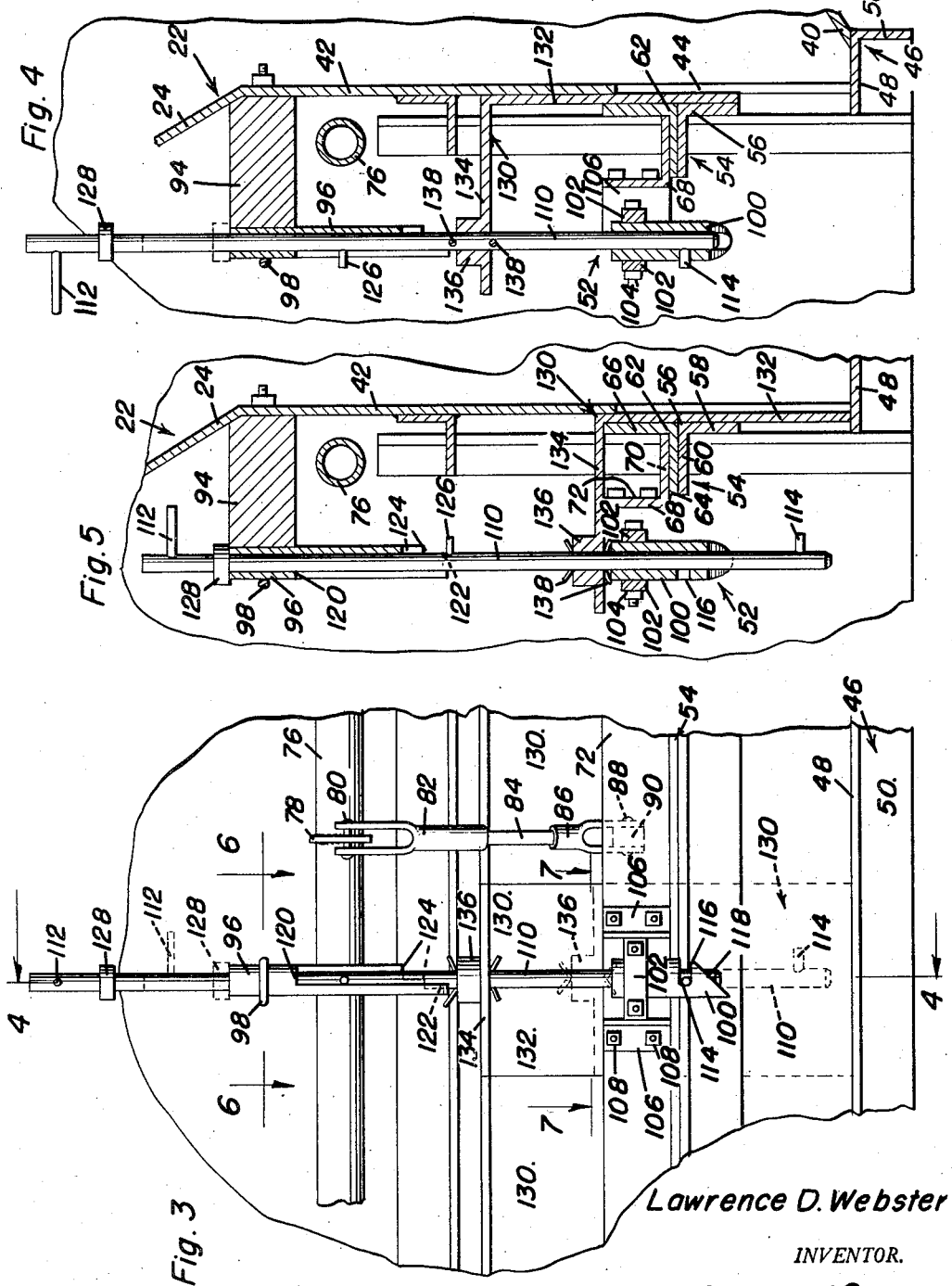

United States Patent Office 2,850,216
Patented Sept. 2, 1958

2,850,216
SEGMENTED GATE FOR SPREADER BOX

Lawrence D. Webster, Livonia, N. Y.

Application February 19, 1954, Serial No. 411,481

4 Claims. (Cl. 222—502)

This invention relates in general to improvements in spreader boxes for dump trucks, and more specifically to a segmented gate for spreader boxes.

In order that gravel, crushed rock, and the like, may be evenly spread over a surface along selected lanes, there have been devised spreader boxes attachable to the rear of dump trucks for receiving the material to be spread from the dump truck body and then controlling the spreading thereof. Such spreader boxes have been provided with gates which include gate segments so that the width of the effective spreading of the loose material can be varied as desired. However, the controls for such gate segments have either been clumsy and difficult to operate or of such a nature whereby the retention of the segmented gates in desired positions has been erratic.

It is therefore the primary object of this invention to provide an improved segmented gate for spreader boxes which is so constructed and designed whereby the gate segments thereof may be quickly and easily opened and closed, as desired.

Another object of this invention is to provide an improved mounting means for a gate segment of a gateway of a spreader box, the mounting means being of such a nature whereby the gate segments may be selectively locked with respect to the gate or to the spreader box so that movement of the gate segments with respect to the spreader box and the gate may be controlled.

Another object of this invention is to provide an improved segmented gate for spreader boxes which is of extremely simple construction and which is formed of readily obtainable materials so as to be economically feasible.

A further object of this invention is to provide improved locking means for gate segments of a spreader box gate, the locking means being simple and easy to operate so that the gate segments may be quickly positioned by an operator of the dump truck spreading the loose material carried thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view of a dump truck provided with a spreader box, the spreader box employing the segmented gate which is the subject of this invention, the gate being in a closed position;

Figure 2 is a fragmentary vertical sectional view taken substantially upon the plane indicated by the section line 2—2 of Figure 1 and shows the relationship of the spreader box with respect to the tail gate of a dump truck, also being shown is the relationship of the gate of the spreader box with respect to the spreader box;

Figure 3 is an enlarged fragmentary rear elevational view of the spreader box of Figure 1 and shows the main gate thereof in a partially open position, the details of one of the gate segments and the support means therefor being clearly illustrated, the details of adjacent gate segments being omitted for purposes of clarity;

Figure 4 is an enlarged fragmentary vertical sectional view taken substantially upon the plane indicated by the section line 4—4 of Figure 3 and shows the manner in which the gate segment is retained in a raised position with the main gate;

Figure 5 is an enlarged fragmentary sectional view similar to Figure 4 and shows the details of the gate segment when it is in closed position and the main gate in its open position;

Figure 6 is an enlarged fragmentary sectional view taken substantially upon the plane indicated by the section line 6—6 of Figure 3 and shows the manner in which a supporting shaft for the gate segment is guidingly carried by the spreader box; and Figure 7 is an enlarged fragmentary sectional view taken substantially on the plane indicated by the section line 7—7 of Figure 3 and shows the manner in which the shaft is guidingly carried by the frame of the main gate.

Referring now to the drawings in detail, it will be seen that there is illustrated in Figures 1 and 2 a conventional dump truck which is referred to in general by the reference numeral 10. The dump truck 10 is provided with a dump body which is referred to in general by the reference numeral 12. The dump body 12 includes a pivotally mounted tail gate 14.

In order that the materials passing beneath the tail gate 14 may be spread over a desired area, there is attached to the tail gate 14 a spreader box which is referred to in general by the reference numeral 22. The spreader box 22 is an irregular polygon in cross section, as in best illustrated in Figure 2, and a top wall 24 thereof is provided with a pair of transversely spaced mounting brackets 26. Carried by each of the mounting brackets 26 is a winch 28 which has mounted thereon a flexible cable 30. The upper end of the flexible cable 30 is connected to a hook 32 which is hooked over the upper end of the tail gate 14. The spreader box 22 is further restrained relative to the tail gate 14 by suitable chains (not shown) which are connected to the dump body 12.

In addition to the top wall 24, the spreader box 22 also includes a front wall 34. A lower portion of the front wall 34 depends downwardly below the tail gate 14 and the upper edge thereof is in abutting engagement with the rear portion of the dump body 12. The materials entering the spreader box 22 are guided toward the rear lower portion thereof by a downwardly and rearwardly sloping bottom wall 40.

Extending between the top wall 24 of the spreader box 22 and the bottom wall 40 thereof is a vertically disposed rear wall 42. The rear wall 42 terminates short of the bottom of the spreader box 22 to form a material discharge opening 44. The lower edge of the material discharge opening 44 is bounded by a gate seat which is referred to in general by the reference numeral 46. The gate seat 46 includes a horizontally disposed flange 48 which extends rearwardly of a plane of the rear wall 42 and a vertically disposed flange 50 which extends downwardly from the flange 48 and forms a stiffener therefor.

In order that the flow of materials from the spreader box 22 may be selectively controlled, carried by the rear wall 42 of the spreader box 22 is a main gate construction which is referred to in general by the reference numeral 52. The main gate construction 52 includes a main gate frame which is referred to in general by the reference numeral 54. The main gate frame 54 extends transversely of the spreader box 22 and is mounted for selective vertical positioning.

As is best illustrated in Figures 4 and 5, the main gate frame 54 is formed by a lower angle member 56 which includes a forwardly disposed vertical flange 58 and an upper inwardly extending horizontal flange 60. The main gate frame 54 also includes an angle member 62 which has a lower horizontal flange 64 which extends rearwardly in overlying relation to the flange 60 and a vertical flange 66 which is disposed in vertical alignment with the flange 58. The main gate frame 54 is further formed by an angle member 68 which has a forwardly extending lower horizontal flange 70 overlying the flange 64. Extending upwardly from the rear end of the horizontal flange 70 is a vertical flange 72.

In order that the main gate construction 52 may be selectively and vertically adjusted, there is suitably journaled in the opposite ends 74 of the spreader box 22 a transversely extending horizontal shaft 76 which is disposed above the main gate frame 54. The horizontal shaft 76 is provided with transversely spaced lugs 78 to which are pivotally connected by pivot pins 80, upper bifurcated fittings 82 of adjustable shafts 84. The adjustable shafts 84 have carried at the lower end thereof lower bifurcated fittings 86 which are pivotally connected by pivot pins 88 to blocks 90 carried by the angle members 68. The ends of the horizontal shaft 76 extend outwardly of the sides 72 of the spreader box 22 and are non-circular in cross section as at 92 for the reception of a crank. By rotating the horizontal shaft 76 with a crank, the main gate frame 54 may be selectively raised and lowered.

Carried by the rear wall 42 of the spreader box 22 adjacent the upper edge thereof is a plurality of transversely spaced, rearwardly extending spacer blocks 94. Each of the spacer blocks 94 has seated in the rear portion thereof a vertically extending guide sleeve 96. The guide sleeve 96 is clamped to both the spacer block 94 and the rear wall 42 by suitable U-bolts 98.

Carried by the main gate frame 54 in vertical alignment with each of the sleeves 96 is a lower guide sleeve 100. The lower guide sleeve 100 is mounted between a pair of transversely disposed bars 102 and clamped relative thereto by a pair of transversely spaced fasteners 104. The bars 102 extend between and are secured to vertically extending angle brackets 106 rigidly secured to the flange 72 of the angle member 68 by fasteners 108.

Carried by each pair of aligned sleeves 96 and 100 is a vertical shaft 110. The vertical shaft 110 is mounted in the sleeves 96 and 100 for both vertical and rotary movement. In order that the vertical shaft 110 may be conveniently rotated, the upper end thereof is provided with an operating handle 112.

The lower portion of the vertical shaft 110 is provided with a projection in the form of a pin 114. The pin 114 is selectively receivable in a horizontal notch 116 formed in the lower portion of the sleeve 100. Also, the lower end of the sleeve 100 is in the form of a cam surface 118 to facilitate the positioning of the pin 114 in the notch 116. It will be seen that by inserting the pin 114 in the notch 116, the vertical shaft 110 may be locked with respect to the main gate frame 54.

Referring now to Figures 3 and 5 in particular, it will be seen that the sleeve 96 is provided with a plurality of vertically extending notches which terminate in an uppermost shoulder 120, a lowermost shoulder 122 and intermediate shoulders 124. In order that the upward movement of the vertical shaft 110 may be selectively controlled, the intermediate portion of the vertical shaft 110 is provided with a projection in the form of a pin 126. The pin 126 is selectively engageable with the shoulders 120, 122 and 124 to limit upward movement of the vertical shaft 110. It is to be understood that when the pin 114 is interlocked with the notch 116, the pin 126 is vertically aligned with the shoulder 120 so that upward movement of the vertical shaft 110 with the main gate frame 54 will be permitted. Downward movement of the vertical shaft 110 is controlled by a shoulder 128 carried by the upper portion thereof and resting on the top of the sleeve 96.

Carried by each of the vertical shafts 110 intermediate their ends is a gate segment which is referred to in general by the reference numeral 130. Each gate segment 130 includes a generally rectangular, vertically disposed gate forming portion 132 which is fixedly engaged with the forward surfaces of the flanges 58 and 60 and which is disposed between the flanges 58 and 66 and the rear wall 42 of the spreader box 22.

Each of the gate segments 130 also includes a rearwardly extending, generally triangular mounting flange 134 which is provided at its rear end portion with a boss 136. Extending through the boss 136 is the vertical shaft 110. The boss 136 is secured to the vertical shaft 110 for vertical movement therewith only by a pair of pins 138 disposed above and below the boss 136 and carried by the vertical shaft 110. Thus, it will be seen that the gate segment 130 may be moved vertically with the vertical shaft 110 and at the same time the vertical shaft 110 may be rotated independently of the gate segment 130.

When the main gate construction 52 of the spreader box 22 is in its closed position, such as is illustrated in Figure 1, the main gate frame 54 is in a lower position with the lower edge of the flange 56 engaging the horizontal flange 48 of the gate seat 46. Also, the lower edge of each gate forming portion 132 is resting upon the horizontal flange 48 and forming a seal therewith to prevent the passage of granular material out through the opening 44. When it is desired to spread granular material through the use of the spreader box 22, the desired width of spread is first determined. Then, those gate segments 130 which would produce the desired spreading of granular material are locked in the main gate frame 54 by rotating their vertical shafts 110 until the pins 114 are seated in the notches 116. In the event it is desired to retain the remainder of the gate segments 130 in engagement with the flange 48, the pins 126 of their associated vertical shafts 110 are aligned with and engaged with the shoulders 122 of their guide sleeves 96. Then the main gate frame 54 is raised by rotating the horizontal shaft 76. As the main gate frame 54 moves upwardly, the gate segments 130 which have their vertical shafts 110 locked with respect to the guide sleeves 100 are raised simultaneously with the main gate frame 54 to permit the passage of granular material out through portions of the opening 44, as desired.

Inasmuch as the spreader box is intended to handle coarse material such as crushed stone or stone chips, gravel, etc., at times such material will become disposed between the lower edge of a gate segment 130 and the flange 48 of the gate seat 46. By providing a plurality of intermediate notches 124, the gate segments may be locked in lowered positions irrespective of the fact that they may not be completely closed. The notches 124 may be spaced at one quarter inch vertical intervals.

It is to be understood that each of the gate segments 130 may be separately controlled. Further, after the main gate frame 54 has been elevated, if it is desired to move any of the gate segments 130, this can be accomplished by rotating the vertical shaft 110 thereof to the desired position and then either forcing the vertical shaft upwardly and downwardly to move the gate segment 130 to its desired position. It will be seen that the construction of the main gate construction 52 is such that it may be easily connected to existing spreader boxes by merely removing their gates and substituting the main gate construction 52 in the place thereof.

From the foregoing, the construction and operation of the device will be readily understood and further explanation is believed to be unnecessary. However, since numerous modifications and changes will readily occur

What is claimed as new is as follows:

1. A segmented gate for spreader boxes comprising a main gate structure vertically adjustably carried by a spreader box, said main gate structure including a main gate frame, a plurality of gate segments vertically adjustably carried by said main gate frame, each of said gate segments being carried by a vertical shaft, said vertical shaft being vertically adjustably carried by said spreader box and said main gate frame, cooperating means carried by said vertical shaft and said main gate frame for selectively locking said vertical shaft to said main gate frame to facilitate raising of a gate segment with said main gate frame, cooperating means carried by said vertical shaft and said spreader box for selectively locking said vertical shaft to said spreader box to prevent movement of a gate segment with said main gate frame.

2. A segmented gate for spreader boxes comprising a main gate structure vertically adjustably carried by a spreader box, said main gate structure including a main gate frame, a plurality of gate segments vertically adjustably carried by said main gate frame, each of said gate segments being carried by a vertical shaft, vertically aligned guides for each vertical shaft carried by said spreader box and said main gate frame, said vertical shaft being mounted for vertical and rotary movement in said guides, said vertical shaft being provided with spaced transverse projections, said guides being provided with notches, said projections being selectively positionable in said notches to lock said vertical shaft selectively to said main gate frame and said spreader box.

3. A segmented gate for spreader boxes comprising a main gate structure vertically adjustably carried by a spreader box, said main gate structure including a main gate frame, a plurality of gate segments vertically adjustably carried by said main gate frame, each of said gate segments being carried by a vertical shaft, said vertical shaft being vertically adjustably carried by said spreader box and said main gate frame, cooperating means carried by said vertical shaft and said spreader box for selectively locking said vertical shaft to said spreader box to prevent movement of a gate segment with said main gate frame, said means including a projection on said vertical shaft, a notched sleeve carried by said spreader box, said sleeve being provided with a plurality of notches for receiving said projection to vary the permissible upward movement of said vertical shaft.

4. A segmented gate for spreader boxes comprising a spreader box, a main gate structure vertically slidably carried by said spreader box, said main gate structure including a main gate frame, a plurality of gate segments vertically slidably carried by said main gate frame, a plurality of shafts disposed parallel to the plane of the main gate structure, there being one shaft for each of said gate segments, aligned guides for each shaft carried by said spreader box and said main gate frame, said shafts being mounted in said guides for sliding and rotary movement, each of said gate segments being carried by a respective one of said shafts, and cooperating rotary locking means carried by each of said shafts and said spreader box for selectively locking said shafts to said spreader box to prevent movement of individual ones of said gate segments within said main gate frame.

References Cited in the file of this patent

UNITED STATES PATENTS

| | | |
|---|---|---|
| 1,838,631 | Naber et al. | Dec. 29, 1931 |
| 1,848,750 | Sager et al. | Mar. 8, 1932 |
| 1,982,773 | Walborn | Dec. 4, 1934 |
| 2,005,896 | Hurt | June 25, 1935 |
| 2,560,732 | Moore | July 17, 1951 |

FOREIGN PATENTS

| | | |
|---|---|---|
| 985,817 | France | Mar. 14, 1951 |
| 428,298 | Great Britain | May 10, 1935 |